(12) United States Patent
Kuroda

(10) Patent No.: US 8,508,677 B2
(45) Date of Patent: Aug. 13, 2013

(54) REFLECTIVE LIQUID CRYSTAL PROJECTOR

(75) Inventor: Yasuto Kuroda, Saitama (JP)

(73) Assignee: Fujifilm Corporation, Tokyo (JP)

( * ) Notice: Subject to any disclaimer, the term of this patent is extended or adjusted under 35 U.S.C. 154(b) by 277 days.

(21) Appl. No.: 13/103,628

(22) Filed: May 9, 2011

(65) Prior Publication Data

US 2011/0279743 A1 Nov. 17, 2011

(30) Foreign Application Priority Data

May 11, 2010 (JP) .................................. 2010-109434

(51) Int. Cl.
*G02F 1/1335* (2006.01)
(52) U.S. Cl.
USPC ............................................................ 349/9
(58) Field of Classification Search
None
See application file for complete search history.

(56) References Cited

U.S. PATENT DOCUMENTS

| | | | |
|---|---|---|---|
| 7,234,816 B2 | 6/2007 | Bruzzone et al. | |
| 8,098,339 B2 * | 1/2012 | Huang | 349/5 |
| 8,282,216 B2 * | 10/2012 | Huang | 353/20 |
| 8,325,120 B2 * | 12/2012 | Ito | 345/87 |
| 2011/0080534 A1 * | 4/2011 | Perng et al. | 349/9 |

FOREIGN PATENT DOCUMENTS

| | | |
|---|---|---|
| JP | 2009-103807 | 5/2009 |
| JP | 2012208202 A | * 10/2012 |

* cited by examiner

*Primary Examiner* — Sung Pak
(74) *Attorney, Agent, or Firm* — Young & Thompson

(57) ABSTRACT

A PBS sheet is curved into a partially cylindrical shape so as to be concave or convex toward a panel surface along a central axis which is perpendicular to both an incident light axis of illumination light and a reflection light axis perpendicular to the incident light axis. The illumination light from a light source is converted into s-polarized light by a polarization converting system, and energy distribution thereof is made uniform by a rod integrator. Then, the illumination light is sequentially split into three color lights, R, G, and B, by a color wheel. The illumination light is approximately totally reflected on the PBS sheet, and applied toward a liquid crystal display panel. The illumination light having been reflected on the PBS sheet illuminates the panel surface with neither too large nor too small illumination range. The R, G, and B component images having been reflected on the panel surface are sequentially projected on a screen so as to be observed as a full color image.

8 Claims, 5 Drawing Sheets

REFLECTIVE LIQUID CRYSTAL PROJECTOR

FIELD OF THE INVENTION

The present invention relates to a reflective liquid crystal projector using a reflective liquid crystal display panel.

BACKGROUND OF THE INVENTION

There is known a reflective liquid crystal projector using a reflective liquid crystal display panel. The reflective liquid crystal display panel is referred to as LCOS (Liquid Crystal On Silicon). Note that "LCos" is a trademark. The LCOS has a structure in which a liquid crystal is sandwiched between a silicon substrate and a transparent substrate opposed to each other. A liquid crystal driving circuit and pixel electrodes are disposed on the silicon substrate. Light having passed through the transparent substrate and a liquid crystal layer is reflected on the pixel electrodes. In a transmissive liquid crystal device, a pair of transparent substrates is used, and a liquid crystal driving circuit and the like are disposed on one of the transparent substrates, thus causing decrease in aperture ratio. In contrast, in a reflective liquid crystal device, circuits are not disposed on the transparent substrate, thus achieving increase in aperture ratio.

In the reflective liquid crystal projector is used a polarizing beam splitter (PBS) having a function as a polarizer for polarizing illumination light to be incident on a liquid crystal display panel and a function as an analyzer for retrieving image light modulated for each pixel by the liquid crystal display panel. In a common PBS, two right-angle prisms are joined at their diagonal surfaces, and between the joined diagonal surfaces is disposed a polarization separating film. The polarization separating film is a multi-layer film including thin films of high-refractive material and thin films of low-refractive material which are alternately laminated on one another. The polarization separating film separates the illumination light depending on its polarization direction so as to transmit p-polarized light and reflect s-polarized light. Further, there is known a PBS in which a multi-layer reflective polarizing film for use as a polarization separating film is attached to a rigid cover (prism) with use of pressure sensitive adhesives, as disclosed in U.S. Pat. No. 7,234,816 (corresponding to Japanese Patent Translation Publication No. 2007-520756), for example.

An illumination optical system for making illumination light incident on a liquid crystal display panel consists of a light source, a light condensing means, a rod integrator, a relay lens, and the like, for example. An image of an exit end face of the rod integrator is formed on a panel surface of the liquid crystal display panel by the relay lens so as to illuminate an effective reflection region of the panel surface. The illumination range of the illumination optical system to be used depends on a size of the liquid crystal display panel, that is, the effective reflection region.

Recently, in accordance with widespread use of a high definition television, an image to be projected by the reflective liquid crystal projector also has been required to correspond to an aspect ratio of 16:9 as a high definition television size, and the screen size of the panel surface of the liquid crystal display panel comes to have an aspect ratio corresponding to the high definition television size. However, in the case where the illumination range of the illumination light has an approximately circular shape as is conventional, an unnecessary region is applied with the illumination light. For the purpose of eliminating the waste of the illumination light described above, there is proposed a lens for an illumination system including a condenser lens and a cylindrical lens as disclosed in Japanese Patent Laid-Open Publication No. 2009-103807, for example.

However, since the polarizing beam splitter, which consists of two right-angle prisms joined at their diagonal surfaces, and the cylindrical lens as described above are expensive and difficult to miniaturize, they cannot be used in an increasingly-demanded inexpensive portable projector which puts emphasis on downsizing.

SUMMARY OF THE INVENTION

In view of the above, an object of the present invention is to provide a downsized reflective liquid crystal projector at low cost.

In order to achieve the above and other objects, a reflective liquid crystal projector of the present invention includes an illumination optical system, a reflective liquid crystal display panel, a projection optical system, and a polarizing beam splitter sheet. The illumination optical system converts light emitted from a light source into illumination light polarized in a predetermined polarization direction. The liquid crystal display panel reflects the illumination light made incident thereon in a reverse direction as well as modulates the illumination light into image light. The polarizing beam splitter sheet consists of a transparent substrate in a form of sheet having flexibility and a polarization separating layer disposed on the substrate. The polarizing beam splitter sheet reflects the illumination light toward the liquid crystal display panel, and transmits the image light from the liquid crystal display panel toward the projection optical system. The polarizing beam splitter sheet is curved into a partially cylindrical shape so as to be concave or convex along a central axis. The central axis extends in a direction perpendicular to both an incident light axis of the illumination light made incident on the polarizing beam splitter sheet and a reflection light axis perpendicular to the incident light axis.

A deformable frame is preferably fitted into a periphery of the polarizing beam splitter sheet so as to keep the polarizing beam splitter sheet from surrounding areas. Further, each of the polarizing beam splitter sheet and the frame preferably has a rectangular shape.

According to the present invention, since the polarizing beam splitter sheet is curved into a partially cylindrical shape so as to be concave or convex toward the panel surface of the liquid crystal display panel, the illumination light can be efficiently applied to the liquid crystal display panel with the illumination range corresponding to the panel surface. Further, according to the present invention, since a prism and a cylindrical lens which cause high cost of production are unnecessary, it is possible to easily achieve a downsized reflective liquid crystal projector at low cost.

Further, since the deformable frame is fitted into the periphery of the polarizing beam splitter sheet, the polarizing beam splitter sheet is easily curved so as to be concave or convex toward the liquid crystal display panel. Furthermore, since each of the polarizing beam splitter sheet and the frame has a rectangular shape, it is possible to illuminate the liquid crystal display panel neither too much nor too little with the illumination range corresponding to the liquid crystal display panel.

DESCRIPTION OF THE DRAWINGS

The above objects and advantages of the present invention will become easily understood by one of ordinary skill in the art when the following detailed description of the preferred embodiments would be read in connection with the accompanying drawings, wherein.

DESCRIPTION OF THE PREFERRED EMBODIMENTS

Hereinafter, preferred embodiments of the present invention are described in detail. However, the present invention is not limited thereto.

Figure 1:
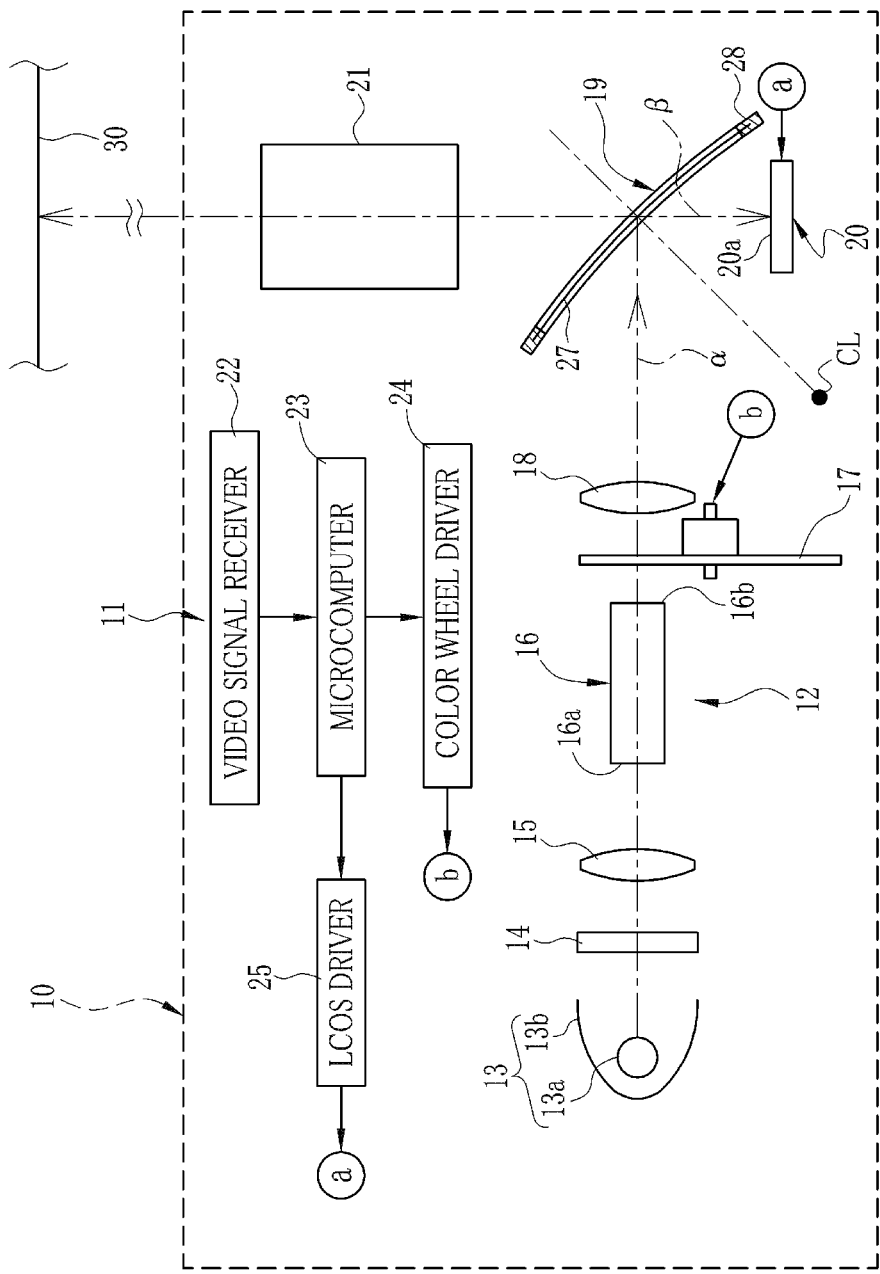
FIG. 1 is a schematic view illustrating a structure of a reflective liquid crystal projector.

In FIG. 1, a reflective liquid crystal projector (hereinafter abbreviated as projector) 10 according to an embodiment of the present invention consists of a control system 11 and an optical system 12. The optical system 12 includes a light source 13, a polarization converting system (PCS) 14, a condenser lens 15, a rod integrator 16, a color wheel (rotatable filter disk) 17, a relay lens 18, a polarizing beam splitter (PBS) 19, a reflective liquid crystal display panel (LCOS) 20, and a projection lens 21 (projection optical system). The projector 10 is a single-plate type projector for generating image light of three colors by using a single liquid crystal display panel 20. The light source 13, the polarization converting system 14, the condenser lens 15, the rod integrator 16, the color wheel 17, and the relay lens 18 constitute an illumination optical system.

The control system 11 includes a microcomputer 23, a color wheel driver 24 for driving the color wheel 17 to rotate, and a LCOS driver 25 for driving the liquid crystal display panel 20. The microcomputer 23 functions for overall control of respective components of the projector 10 based on a video signal received by the video signal receiver 22. To the video signal receiver 22 are inputted video signals such as composite signals and component signals from a tuner, a video player, or the like which is connected to an external input terminal or the like.

The light source 13 consists of a white light emitting diode (hereinafter referred to as white LED) 13a and a reflector 13b for reflecting luminous flux of illumination light emitted from the white LED 13a as approximately parallel light. As is well known, the polarization converting system 14 consists of a polarization separating film, a reflective film, and a retardation film. The polarization separating film separates randomly polarized light emitted from the light source 13, so as to transmit s-polarized light and reflect p-polarized light. The p-polarized light whose optical path is bent by approximately 90° by the reflective film is converted into the s-polarized light by the retardation film. Thereby, the randomly polarized light emitted from the light source 13 is absolutely converted into the s-polarized light by the polarization converting system 14.

The illumination light converted into the s-polarized light by the polarization converting system 14 is condensed by the condenser lens 15, and then made incident on an incident end face 16a of the rod integrator 16. The rod integrator 16 is a lens in the shape of quadrangular prism (rod lens) made by glass. The illumination light made incident on the incident end face 16a is totally reflected inside the rod integrator 16 such that the flux of the illumination light is superimposed. Thereby, energy distribution of the illumination light to be emitted from an exit end face 16b of the rod integrator 16 is made uniform.

Figure 2:
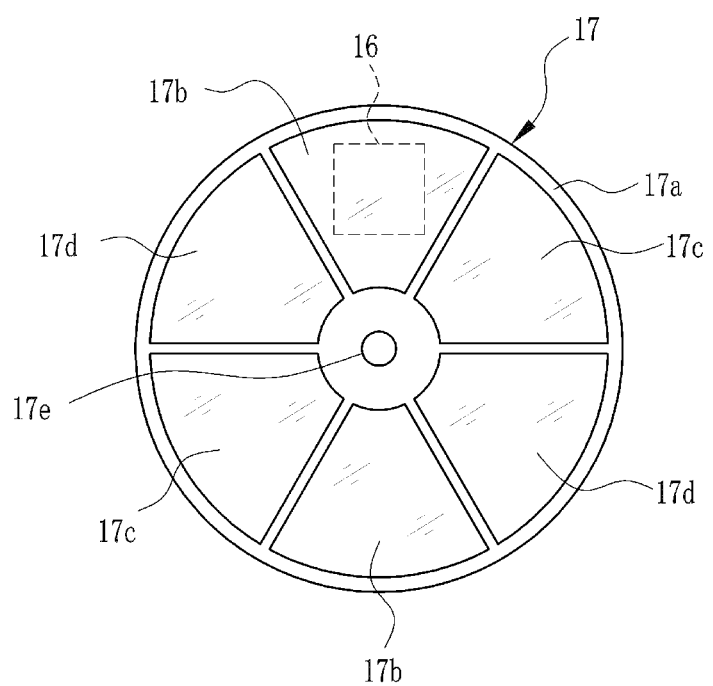
FIG. 2 is a plan view illustrating a color wheel.

As shown in FIG. 2, the color wheel 17 is an approximately disc-shaped board 17a on which an R-filter 17b for transmitting R light alone, a G-filter 17c for transmitting G light alone, and a B-filter 17d for transmitting B light alone are alternately arranged equiangularly in equal distance from a central axis 17e of the board 17a. The filters 17b to 17d are of the same size and in the shape of fan.

The color wheel 17 is driven by the color wheel driver 24. Rotation start timing and rotation speed of the color wheel 17 are controlled by the microcomputer 23. In accordance with the rotation of the color wheel 17, the filters 17b to 17d are caused to face the exit end face 16b of the rod integrator 16 in a selective manner, such that the illumination light is split into three color lights of R (red), G (green) and B (blue), on a time division basis.

By the control of the microcomputer 23, the color wheel driver 24 is driven in synchronization with the LCOS driver 25. A rectangular panel surface 20a (see FIG. 3) of the liquid crystal display panel 20 displays R color components of a projection image when the illumination light is R (red), G (green) color components of the projection image when the illumination light is G (green), and B (blue) color components of the projection image when the illumination light is B (blue). Displaying of one set of R, G, and B color components is switched per 1/30 seconds, for example.

Figure 3:
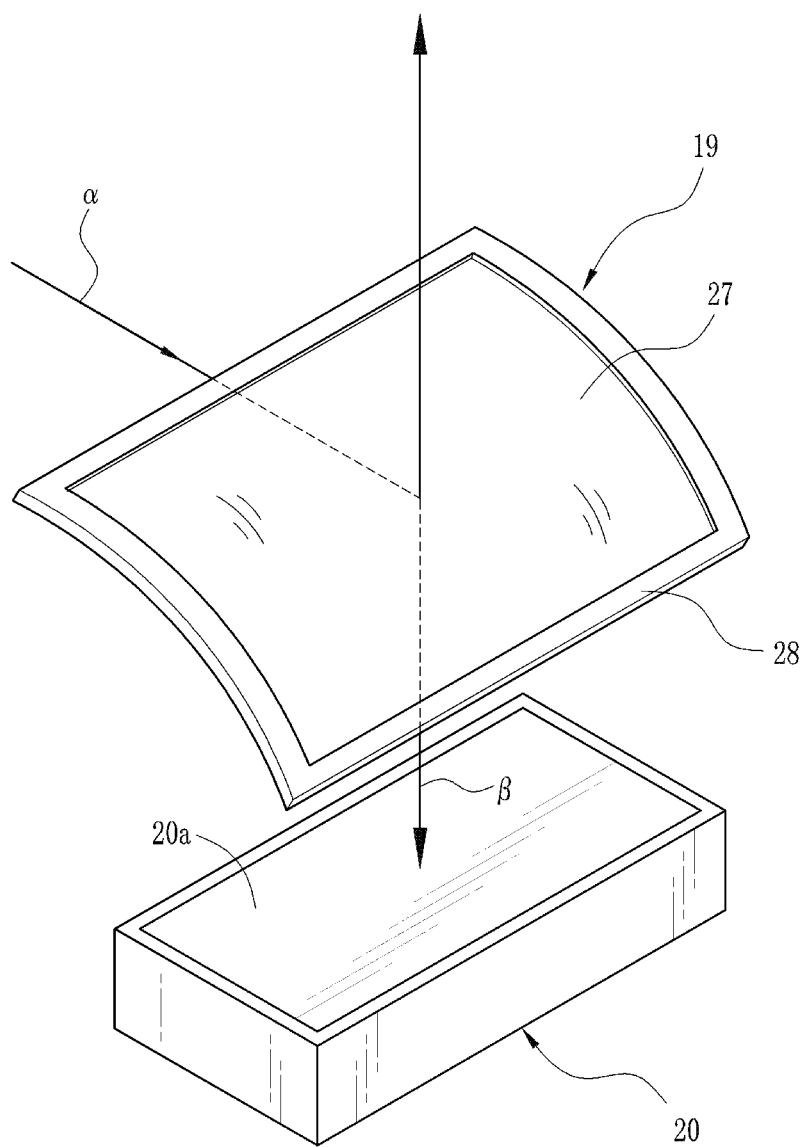
FIG. 3 is an explanatory view illustrating a polarizing beam splitter curved so as to be concave toward a panel surface of a liquid crystal display panel.

As shown in FIG. 3, the PBS 19 consists of a polarizing beam splitter sheet (hereinafter abbreviated as PBS sheet) 27 and an aluminum frame 28 fitted into a periphery of the PBS sheet 27. The PBS sheet 27 is a rectangular sheet which is flexibly deformable. The frame 28 keeps the PBS sheet 27 in an arbitrary shape. The PBS sheet 27 includes a not-shown transparent substrate in the form of sheet having flexibility such as polyethylene terephthalate (PET) on which a not-shown multi-layer film is disposed as a polarization separating layer. The polarization separating layer is a dielectric multi-layer film including thin films of high-refractive index material and thin films of low-refractive index material which are alternately laminated on one another.

The polarization separating layer separates the illumination light made incident thereon from the relay lens 18 into the p-polarized light and the s-polarized light, whose vibration directions are orthogonal to each other, and then transmits the p-polarized light and reflects the s-polarized light. Since the illumination light to be applied to the PBS sheet 27 is converted into the s-polarized light by the polarization converting system 14, the illumination light is approximately totally reflected on the polarization separating layer of the PBS sheet 27. Note that, as the PBS sheet 27 is used a multi-layer reflective polarizing film disclosed in U.S. Pat. No. 7,234,816 (corresponding to Japanese Patent Translation Publication No. 2007-520756), for example.

The frame 28 is curved such that the PBS sheet 27 has a partially cylindrical shape which is concave toward the panel surface 20a along a central axis CL (see FIG. 1). The central axis CL is perpendicular to both an incident light axis α of the illumination light and a reflection light axis β perpendicular to the incident light axis α. Namely, in a three-dimensional coordinate XYZ, when X-axis and Y-axis denote the incident light axis α and the reflection light axis β, the central axis CL corresponds to Z-axis. The central axis CL extends in a direction perpendicular to the paper plane of FIG. 1.

Figure 4:
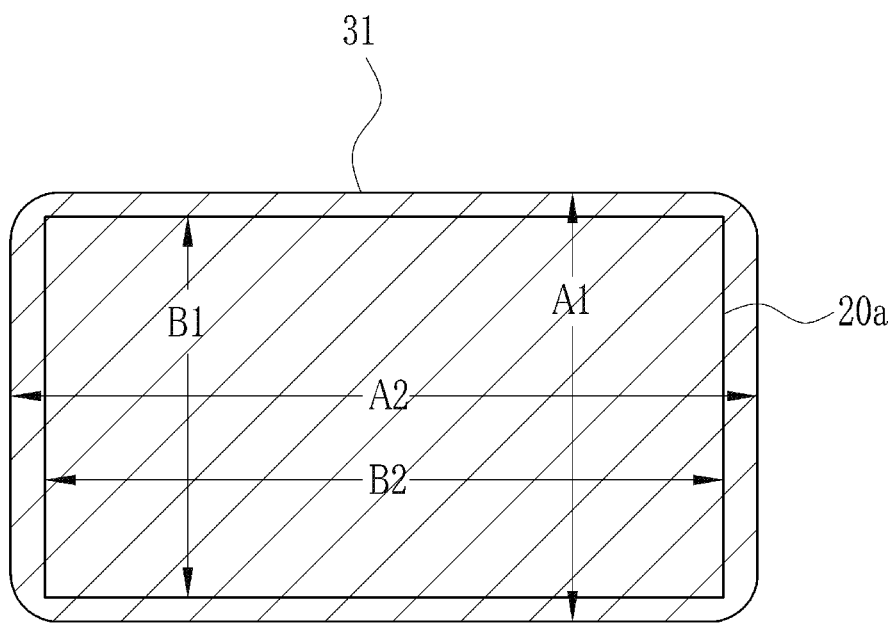
FIG. 4 is an explanatory view illustrating an illumination range of illumination light toward the panel surface of the liquid crystal display panel.

FIG. 4 shows an illumination range 31 applied with the illumination light having been reflected on the curved PBS sheet 27. The illumination range 31 is a hatched area in the drawing. A length A1 of the illumination range 31 corresponding to the longitudinal direction of the rectangular panel surface 20a is shorter in comparison with the case where the PBS sheet 27 has a flat surface. Additionally, the length A1 is slightly longer than a longitudinal length B1 of the panel surface 20a. Further, a length A2 of the illumination range 31 corresponding to the transverse direction of the panel surface 20a is constant without being changed in accordance with the curving of the PBS sheet 27, and slightly longer than a transverse length B2 of the of the panel surface 20a. As a result, since the panel surface 20a is illuminated neither too much nor too little due to the illumination range 31, the illumination light from the optical system 12 is absolutely applied to the panel surface 20a. Accordingly, usage efficiency of the illumination light is increased, and therefore it is possible to obtain a bright projection image without using a light source with a large light amount. Note that, the PBS sheet 27 is tilted by 45 degrees from the incident light axis α.

When the illumination light having been reflected on the PBS sheet 27 is applied to the panel surface 20a of the liquid crystal display panel 20, the illumination light is modulated depending on the image displayed on the panel surface 20a, and then reflected as the image light on the panel surface 20a. The image light contains p-polarized light components and p-polarized light components depending on the image displayed on the panel surface 20a. Since the PBS sheet 27 transmits the p-polarized light components alone, the p-polarized light components alone travel toward the projection lens 21.

Although being simplistically shown in the drawing, in practice, the projection lens 21 consists of a plurality of lens groups disposed on the optical axis and a lens moving mechanism for zooming and focusing. The image light is formed on the screen 30 by the projection lens 21. As described above, the R, G, and B color components of the projection image are sequentially formed on the screen 30 for 1/30 seconds, for example, and combined together on the screen 30. Accordingly, a full-color image that is comfortable for human eye is observed on the screen 30.

Next, an operation of the above configuration is described. When the projector 10 is powered on, the white LED 13a of the light source 13 is lighten up. The LCOS driver 25 drives the liquid crystal display panel 20 based on the video signal received by the video signal receiver 22. The color wheel driver 24 drives the color wheel 17 to rotate in accordance with the driving timing of the liquid crystal display panel 20.

The illumination light emitted from the white LED 13a is reflected on the reflector 13b to be approximately parallel light. Then, the illumination light is incident on the polarization converting system 14, and converted into the s-polarized light by the polarization converting system 14. The s-polarized light as the illumination light is condensed by the condenser lens 15 and is incident on the incident end face 16a of the rod integrator 16, such that the energy distribution of the illumination light is made uniform in the rod integrator 16. The illumination light emitted from the rod integrator 16 is sequentially converted into three colors, R (red), G (green) and B (blue), by the color wheel 17, and then sequentially applied to the PBS 19 by the relay lens 18.

The s-polarized light as the illumination light applied to the PBS 19 is approximately totally reflected on the PBS 19, and applied toward the liquid crystal display panel 20. Since the PBS 19 is curved so as to be concave toward the panel surface 20a of the liquid crystal display panel 20, the illumination light reflected on the PBS 19 illuminates the panel surface 20a of the liquid crystal display panel 20 neither too much nor too little due to the illumination range 31 shown in FIG. 4.

The color wheel 17 is caused to rotate in accordance with the driving timing of the liquid crystal display panel 20, and the illumination light of each color R, G, and B is sequentially applied to the panel surface 20a. Then, the R, G, and B component images having been reflected on the panel surface are sequentially projected on the screen 30 to be combined together on the screen 30. Accordingly, the full color image can be observed on the screen 30.

Since the projector 10 of this embodiment adopts the PBS 19 in the form of sheet which is thin, right, and compact, it is not necessary to utilize a polarizing beam splitter using right-angle prisms which is expensive and requires large installation space, and a special cylindrical lens. Therefore, it is possible to easily miniaturize the projector 10 and decrease the manufacturing cost of the projector 10.

Figure 5:
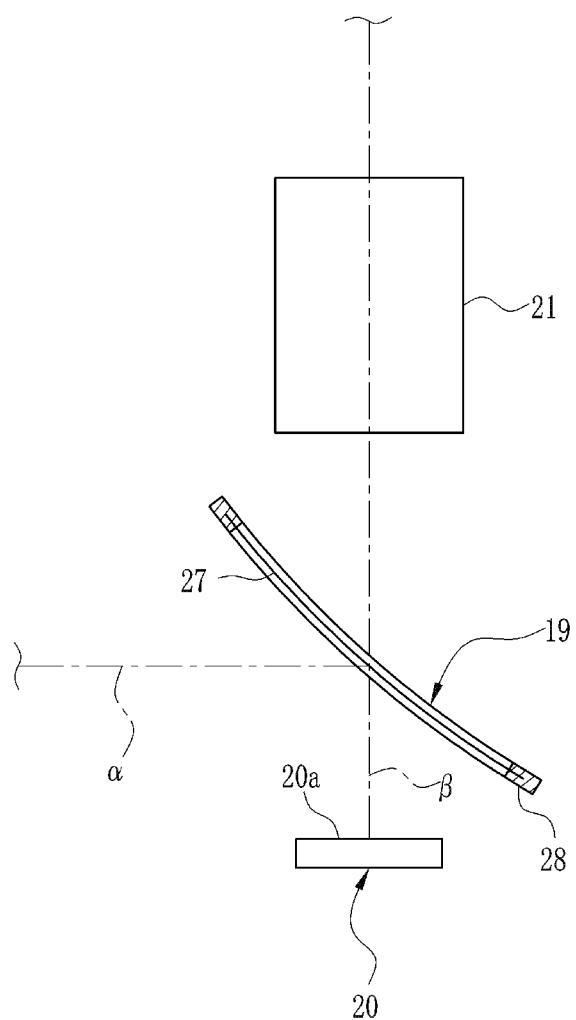
FIG. 5 is an explanatory view illustrating the polarizing beam splitter curved so as to be convex toward the panel surface of the liquid crystal display panel.

Although the PBS 19 is curved so as to be concave toward the liquid crystal display panel 20 in the above embodiment, the present invention is not limited thereto. For example, in the case where the length A1 of the illumination range 31 is shorter than the length B1 of the panel surface 20a in the optical system 12, the PBS 19 may be curved so as to be convex toward the liquid crystal display panel 20 as shown in FIG. 5. Thereby, even when a small-sized optical system is used, the length A1 of the illumination range 31 is longer than the length B1 of the panel surface 20a. As a result, as shown in FIG. 4, the panel surface 20a is illuminated neither too much nor too little due to the illumination range 31. Thereby, it is possible to miniaturize the reflective liquid crystal projector more although the light amount of the illumination light is decreased.

Although the single-plate type reflective liquid crystal projector using one LCOS is adopted in the above embodiment, the present invention is not limited thereto. A three-plate type reflective liquid crystal projector using three LCOSs, which generates the image light of three colors R, G, and B respectively, may be adopted. In this case, although a color combining optical system for the image light of three colors is necessary, there is no need to use the color wheel, the color wheel driver, and the like.

Although the rod integrator is utilized so as to make the illumination light uniform in the above embodiment, the present invention is not limited thereto. For example, there can be adopted an optical system in which two well-known fly eye lenses each having single lenses arranged in a matrix are combined so as to cancel illuminance unevenness.

Various changes and modifications are possible in the present invention and may be understood to be within the present invention.

What is claimed is:

1. A reflective liquid crystal projector comprising:
an illumination optical system for converting light emitted from a light source into illumination light polarized in a predetermined polarization direction;
a reflective liquid crystal display panel for modulating said illumination light into image light;
a projection optical system for projecting said image light on a screen; and
a polarizing beam splitter sheet including a transparent substrate in a form of sheet having flexibility and a polarization separating layer disposed on said substrate, said polarizing beam splitter sheet reflecting said illumination light made incident thereon along an incident light axis toward said reflective liquid crystal display panel along a reflection light axis approximately perpendicular to said incident light axis, and transmitting said image light from said reflective liquid crystal display panel toward said projection optical system, and said polarizing beam splitter sheet being curved into a partially cylindrical shape so as to be concave or convex along a central axis which is perpendicular to both said incident light axis and said reflection light axis.

2. A reflective liquid crystal projector as defined in claim 1, wherein a deformable frame is fitted into a periphery of said polarizing beam splitter sheet so as to keep said polarizing beam splitter sheet from surrounding areas.

3. A reflective liquid crystal projector as defined in claim 2, wherein each of said polarizing beam splitter sheet and said frame has a rectangular shape.

4. A reflective liquid crystal projector as defined in claim 3, wherein said polarizing beam splitter sheet reflects p-polarized light components contained in said illumination light, and transmits p-polarized light components contained in said image light.

5. A reflective liquid crystal projector as defined in claim 4, wherein each of said reflective liquid crystal display panel and said polarizing beam splitter sheet has a rectangular shape.

6. A reflective liquid crystal projector as defined in claim 5, wherein said polarizing beam splitter sheet is tilted by 45 degrees from said incident light axis.

7. A reflective liquid crystal projector as defined in claim 6, wherein said reflective liquid crystal display panel and said projection optical system are arranged so as to be opposed to each other across said polarizing beam splitter sheet so as to be on said reflection light axis and an extended line of said reflection light axis.

8. A reflective liquid crystal projector as defined in claim 7, wherein a color wheel having filters of three primary colors is rotatably disposed in said illumination optical system.

\* \* \* \* \*